United States Patent [19]

Hashimoto

[11] Patent Number: 4,768,085
[45] Date of Patent: Aug. 30, 1988

[54] IMAGE SENSING APPARATUS

[75] Inventor: Seiji Hashimoto, Yokohama, Japan

[73] Assignee: Canon Kabushiki Kaisha, Tokyo, Japan

[21] Appl. No.: 813,509

[22] Filed: Dec. 26, 1985

[30] Foreign Application Priority Data

Dec. 28, 1984 [JP] Japan .................. 59-274902
Dec. 28, 1984 [JP] Japan .................. 59-274903
Dec. 28, 1984 [JP] Japan .................. 59-274904

[51] Int. Cl.$^4$ ............................................. H04N 9/077
[52] U.S. Cl. ......................................... 358/48; 358/44
[58] Field of Search .................. 358/48, 44, 43, 41

[56] References Cited

U.S. PATENT DOCUMENTS 4,065,785 12/1977 Adcock et al. .............. 358/44
4,151,553 4/1979 Susihara ....................... 358/48 X
4,335,405 6/1982 Sakane et al. ............... 358/213
4,437,112 3/1984 Tanaka et al. ................ 358/44
4,504,865 3/1985 Nishizara et al. ............. 358/44 X
4,513,313 4/1985 Kinoshita et al. ............ 358/44
4,517,588 5/1985 Kuwayama et al. .......... 358/44
4,580,160 4/1986 Ochi et al. .................... 358/48

FOREIGN PATENT DOCUMENTS 0157660 10/1985 European Pat. Off. ......... 358/48

Primary Examiner—James J. Groody
Assistant Examiner—E. Anne Faris
Attorney, Agent, or Firm—Fitzpatrick, Cella, Harper & Scinto

[57] ABSTRACT

An image sensing apparatus includes an image information readout unit for performing plural times simultaneous reading of a plurality of horizontal lines of image information accumulated in a nondestructively readable image sensor, and a signal processing unit for forming signals corresponding to one frame by utilizing vertical correlation of image information read out of the adjacent horizontal lines, whereby it is possible to obtain frame image signals of a high resolution with a smaller number of pixels.

35 Claims, 8 Drawing Sheets

IMAGE SENSING APPARATUS

BACKGROUND OF THE INVENTION

The present invention relates to an image sensing apparatus for forming a frame image by using a single solid-state image sensor.

A popular apparatus currently used for reproducing an image signal is a television receiver. One of the signals to be inputted to the television receiver is a video signal conforming with the PAL or NTSC system which adopts an interlaced scanning system.

Therefore, if a television receiver receiving such a video signal is to be used, it is necessary to provide an image sensing apparatus, which generates video signals processed by interlaced scanning, i.e., odd and even field signals. To this end, a frame image sensor is mostly used in image sensing apparatus, except those simple apparatus for field image sensing.

As a frame image sensor, there is known a sensor of the type that image sensing cells for odd and even fields are alternatively arranged. However, a sufficient number of image sensing cells of the frame image sensor cannot be realized in the horizontal direction due to certain problems of current LSI technology. Therefore, to obtain a high resolution of an image, it is necessary to utilize vertical correlation of the image. Furthermore, it is necessary to make the frame image sensor compatible with both stationary and dynamic image sensing.

In view of the above problem associated with the frame image sensor, vertical correlation and so on, it is hard to say that a fine quality of image can be obtained with present image sensors which read an image through transfer of electrical charges which have been accumulated upon light excitation.

For instance, in the case of an image sensor alternatively disposing odd and even field image sensing cells, such as conventional IL-CCD, X-Y address type MOS and the like, it is necessary to provide such expedients as delay lines for performing a vertical correlation process. Therefore, a complicated circuit arrangement is required, and moreover there arises a problem that a false signal is liable to occur due to a long distance in vertical correlation.

A solid-state image sensor solving the above problem of correlation distance is disclosed as an X-Y address type MOS in the Japanese Unexamined Publication (Kokai) No. 50684/1984. However, in this case, an additional signal processing system and a stationary image recording head capable of writing both odd and even fields at the same time are required. Therefore, some problems arise in its circuit and cost.

SUMMARY OF THE INVENTION

The present invention has been made in view of the above problems. It is an object of the present invention to provide an image sensing apparatus capable of forming a frame image of a high quality and with a simple circuit arrangement, and to provide a color filter pattern most suitable for a nondestructively readable image sensor.

To achieve the above object, according to an embodiment of the present invention, the image sensing apparatus comprises image information readout means for performing, plural times, simultaneous reading of a plurality of horizontal lines of image information accumulated in a nondestructively readable image sensor, and signal processing means for forming signals corresponding to a one-frame image by utilizing vertical correlation of image information read out of the adjacent horizontal lines. Therefore, it is possible to shorten the vertical correlation distance so that occurrence of a false signal can effectively be reduced and a frame image of a high quality can be formed. Furthermore, it is advantageous in that a simple circuit arrangement can be employed without a conventional complicated signal processing system.

According to another embodiment of the invention, image information readout means performs, plural times, simultaneous reading of two horizontal lines of image information accumulated in a nondestructively readable image sensor. Therefore, it is possible to produce an image similar to that of a high resolution and low moire with a small number of pixels.

According to still another embodiment of the invention, an image information readout means has the features that it performs, plural times, simultaneous reading of three horizontal lines of image information accumulated in a nondestructively readable image sensor. Therefore, it is possible to produce an image of a high resolution with a small number of pixels.

According to still another embodiment of the invention, the image sensing apparatus comprises a color separation filter composed in a matrix configuration of a plurality of red light filter, blue light filter and green light filter, image information readout means for performing, plural times, simultaneous reading of a plurality of horizontal lines of image information accumulated in a nondestructively readable image sensor, and signal processing means for forming signals corresponding to one-frame image by utilizing vertical correlation of image information read out of the adjacent horizontal lines. Therefore, it is possible to obtain an image of a high resolution even if the number of pixels of the image sensor is the same as that of a nondestructively nonreadable image sensor.

According to still another embodiment of the invention, the image sensing apparatus comprises a color separation filter composed in a matrix configuration of a plurality of red light filters, blue light filters and green light filters, any combination of three adjacent color light transmission filters being arranged to include red, blue and green light filters, image information readout means for performing, plural times, simultaneous reading of three horizontal lines of image information accumulated in a nondestructively readable image sensor, and signal processing means for forming signals corresponding to one-frame image by utilizing vertical correlation of image information read out of the adjacent horizontal lines. Therefore, it is advantageous in that both low and high frequency range luminance signals are readily produced.

According to still another embodiment of the invention, a signal processing means produces a low-band luminance signal from an image signal of one horizontal line among the image signals of three horizontal lines simultaneously read out of the nondestructive readable image sensor, and produces a high-band luminance signal from image signals of all of the horizontal lines. Therefore, moire is relatively unlikely to occur even if an objective having a stripe pattern in the horizontal or vertical direction is to be sensed.

The other object and features of the present invention will become apparent from the following description and accompanying drawings.

DETAILED DESCRIPTION OF THE PREFERRED EMBODIMENTS

First, a first embodiment of the invention will be described with reference to FIGS. 1 to 4.

Figure 1:
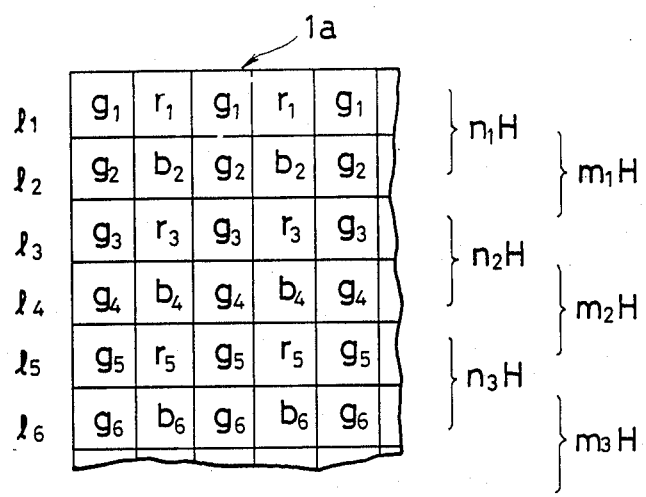
FIG. 1 is an illustrative view showing an example of the arrangement of a color separation filter used with a first embodiment of the invention.

FIG. 1 shows an example of the arrangement of a color separation filter 1. In the figure, $l_1, l_2, l_3, \ldots$ represent horizontal lines whose number is about 490 in the case of the NTSC system for example. Along the odd horizontal lines $l_1, l_3, l_5, \ldots$, green light transmission filters g transmitting green light and red light transmission filters r transmitting red light are alternatively disposed, while along the even horizontal lines $l_2, l_4, l_6$, green light transmission filters g and blue light transmission filters b transmitting blue light are alternatively disposed. The number of pixels of one horizontal line is for example 570. Upon application of different color lights obtained through the color separation filter 1, electrical charges as color signals are accumulated in each pixel of the nondestructively readable image sensor. In this embodiment, a color signal is read out of the nondestructively readable image sensor (hereinafter called SIT) by means of simultaneous reading of two horizontal lines. $n_1H, n_2H, n_3H, \ldots$ represent combinations of horizontal lines $l_1, l_2, l_3, \ldots$ simultaneously read in forming odd fields, while $m_1H, m_2H, m_3H, \ldots$ represent combinations of horizontal lines $l_1, l_2, l_3, \ldots$ simultaneously read in forming even fields. In particular, adjacent horizontal lines are sequentially and simultaneously read, e.g., horizontal lines $l_1$ and $l_2$ for $n_1H$, horizontal lines $l_3$ and $l_4$ for $n_2H$ and so on in the odd fields. In the even fields, to interpolate the image signals in the odd fields, combinations shifted by one line from the combinations $n_1H, n_2H, \ldots$ are read. Specifically, two horizontal lines shifted by one line from the combinations in the odd fields are simultaneously read out, e.g., horizontal lines $l_2$ and $l_3$ for $m_1H$, horizontal lines $l_4$ and $l_5$ for $m_2H$ and so on. Thereafter, color signals read as the above combinations are subjected to the signal processing described later by utilizing vertical correlation.

Figure 2:
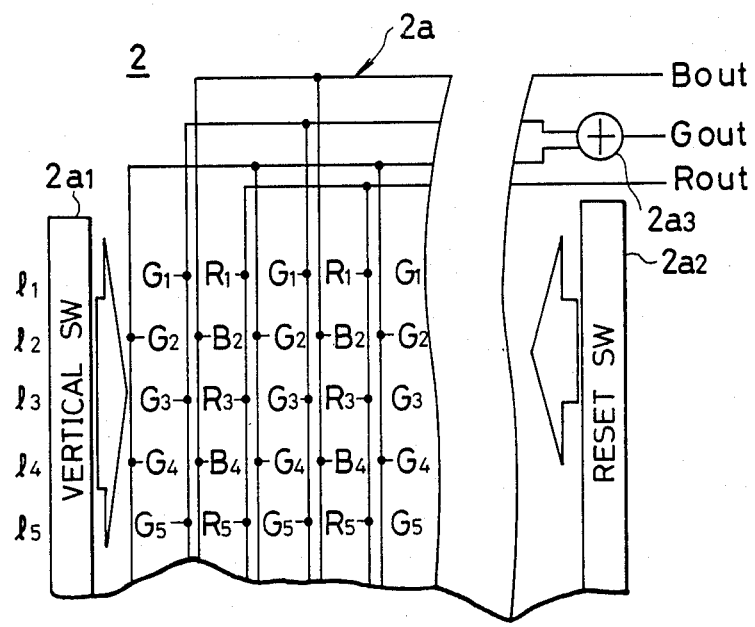
FIG. 2 is a schematic view showing signal readout means of the first embodiment of the invention.

FIG. 2 schematically shows signal readout means $2a$ associated with SIT2. In this embodiment, a four-line output system is employed wherein two G (green) signals, two R (red) signals and two B (blue) signals of every two horizontal lines can independently be read. With this system, a sample-and-hold circuit becomes unnecessary although otherwise it has commonly been required in the signal processing described later. Each horizontal line $l_1, l_2, l_3, \ldots$ is selected with a vertical switch $2a_1$, and each pixel signal is selected with an unrepresented horizontal transfer switch. Resetting of storage charge of each pixel is carried out with a vertical reset switch $2a_2$. The vertical reset switch $2a_2$ operates differently in timings of stationary and dynamic image sensing.

In stationary image sensing, unnecessary charges accumulated in all of the image sensing cells of SIT2 are reset at the same time, and a shutter is closed after a lapse of a predetermined time, thus controlling the storage time for the electrical charges. After a lapse of the predetermined time, $n_1H, n_2H, \ldots$ are sequentially read from SIT2 having stored charges to form image signals of the odd fields. Thereafter, $m_1H, m_2H, \ldots$ are sequentially read to form image signals of the even fields. Thus, image signals corresponding to one frame are obtained.

In dynamic or animated image sensing, a reset is effected immediately after a signal is read, and the storage time is determined based on the read timing of the next signal. In this case, since simultaneous reading of two horizontal lines is employed, line combinations are different in the odd and even fields. Therefore, it is preferable to reset taking this fact into consideration. For instance, referring to FIG. 1, after a signal for $n_1H$ in the odd field is read, two horizontal lines $l_2$ and $l_3$ are reset to read a signal for $m_1H$ in the next even field so that the storage times for horizontal lines $l_2$ and $l_3$ become equal. Therefore, no difference in level of the signals read from two horizontal lines $l_2$ and $l_3$ is present. Such construction is one of the features of the present invention. Also, for each nH and mH in both odd and even fields, resetting of electrical charges is carried out to make the storage times equal to each other.

In the above embodiment, simultaneous resetting of each horizontal line has been described. However, by resetting in units of each pixel, the storage time for each pixel will be made completely the same.

Figure 3:
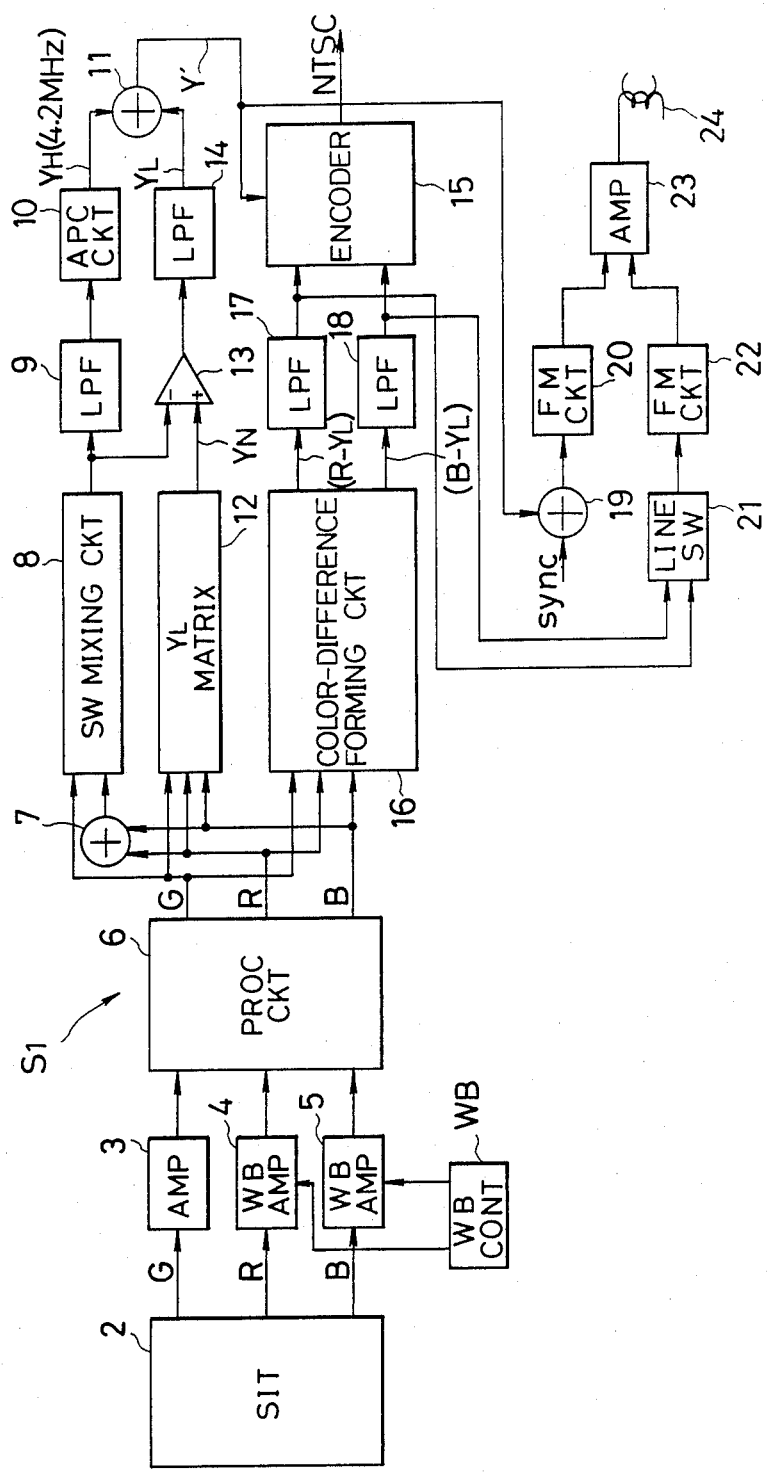
FIG. 3 is a block diagram showing signal processing means of the first embodiment of the invention.

FIG. 3 is a block diagram showing signal processing means $S_1$ for processing color signals read out of SIT2 shown in FIG. 2.

Figure 4:
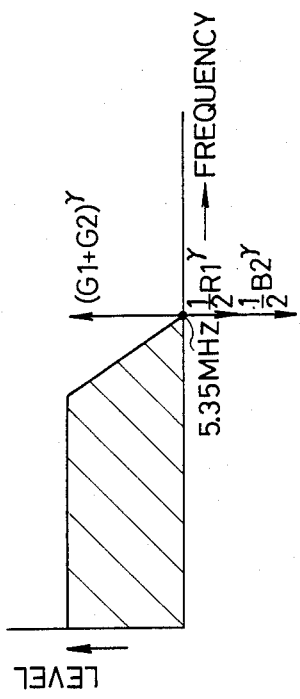
FIG. 4 is a graph showing return distortion in FIG. 3.

In the figure, R, G and B signals outputted from SIT2 are inputted to an amplifier 3 and white balance amplifiers 4 and 5 respectively having almost the same delay time, and white-balanced in response to signals from a white balance controller WB. Thereafter, R, G and B signals are inputted to the next stage process circuit 6. Clamping, r compensation and the like are performed at the process circuit 6. In this case, since G, B and R signals are processed at the circuits of similar construction, G, B and R signals outputted from the process circuit 6 are subjected to almost the same time delay. Two halves of each R and B signals outputted from the process circuit 6 are added together at an adder 7 and inputted, together with G signal, to a switch mixing circuit 8. At the switch mixing circuit 8, G signal $(G_1+G_2)$ and R signal+B signal $(R_1+B_2)$ are switch-mixed with a phase difference of 180° in accordance with their spatial locations. Thus, as shown in FIG. 4, the sampling return components are cancelled out by the carrier frequency of each color component to thereby enable image sensing over the frequency range represented by oblique lines in FIG. 4. A signal outputted from the switch mixing circuit 8 passes through a low-pass filter 9 having a cutoff frequency of about 4.2 MHz, and is contour emphasized at an APC circuit 10 to be inputted to an adder 11.

A luminance signal YN=0.30 R+0.59 G+0.11 B in conformity with the NTSC system is formed at a YL matrix circuit 12 based on R, G and B signals inputted from the process circuit 6. The luminance signal YN is inputted to a subtractor 13 to effect subtraction with respect to an output from the switch mixing circuit 8. And after passing through a low-pass filter 14 having a cutoff frequency of about 1 MHz, a low frequency range luminance signal YL is obtained. Addition at the adder 11 of signal YH (4.2 MHz) outputted from the APC circuit 10 and signal YL (1 MHz) passed through the low-pass filter 14 enables to obtain a composite luminance signal Y' including the low frequency range luminance signal YH. That is, signal Y'=YL+YH is obtained from the adder 11. An output Y' from the adder 11 is then inputted to an encoder 15.

Color-difference signals (R−YL) and (B−YL) are produced at a color difference forming circuit 16 based on R, G and B signals inputted from the process circuit 6. Color-difference signals are inputted to and modulated at the encoder 15 via respective low-pass filters 17 and 18. An NTSC signal is formed at and outputted from the encoder 15 based on color-difference signals (R−YL) and (B−YL) and signal Y' from the adder 11.

In the case of stationary image sensing, signal Y' outputted from the adder 11 is superimposed upon sync signal SYNC at an adder 19 and thereafter frequency-modulated at a frequency modulation circuit 20. Color-difference signals (R−YL) and (B−YL) outputted from the low-pass filters 17 and 18 are converted at a line switching circuit 21 into a line-sequential signal for each 1 H. The color-difference signals are then frequency-modulated at a frequency modulation circuit 22 and in turn added with signal Y' frequency-modulated at an amplifier 23 to thereby record the amplifier output in a magnetic recording medium with a magnetic head 24.

Figure 5:
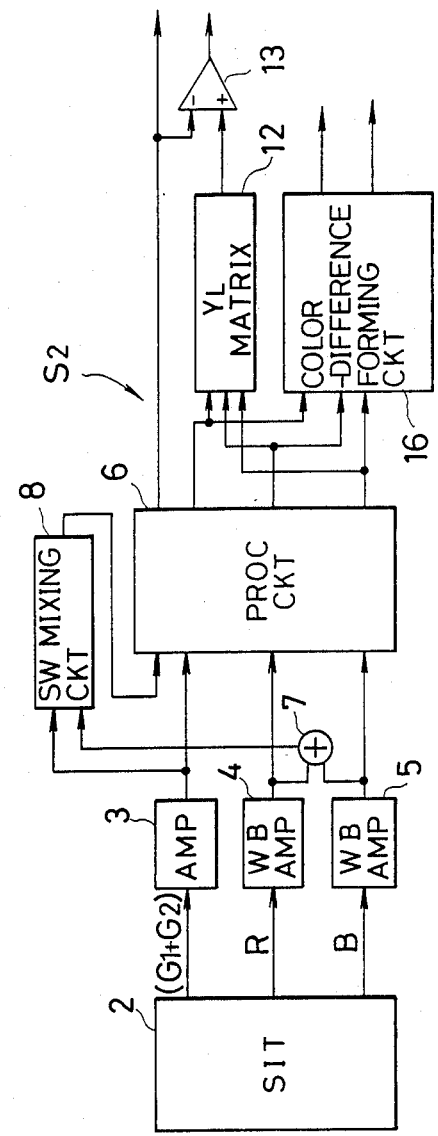
FIG. 5 is a block diagram of signal processing means of a second embodiment of the invention.

FIG. 5 is a block diagram showing a second embodiment of the present invention. In the first embodiment, switch mixing of the average value of G signal, and R and B signals are carried out after the signal processing, whereas in the second embodiment, prior to the signal processing the switch mixing is carried out. In the second embodiment, requirements of circuit accuracy are lightened as compared with the first embodiment, where accurate circuits are required in respect of the high frequency characteristics and delay characteristics between channels. Return distortion of the second embodiment is as shown in FIG. 6.

Figures 6, 7:
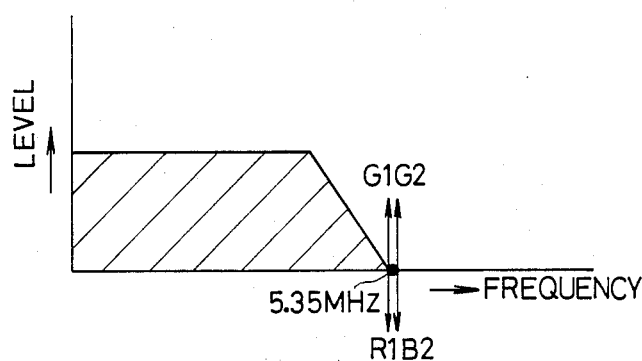
FIG. 6 is a graph showing return distortion in FIG. 5.
FIG. 7 is an illustrative view showing an example of the arrangement of a color separation filter used with a third embodiment of the invention.
Figure 8:
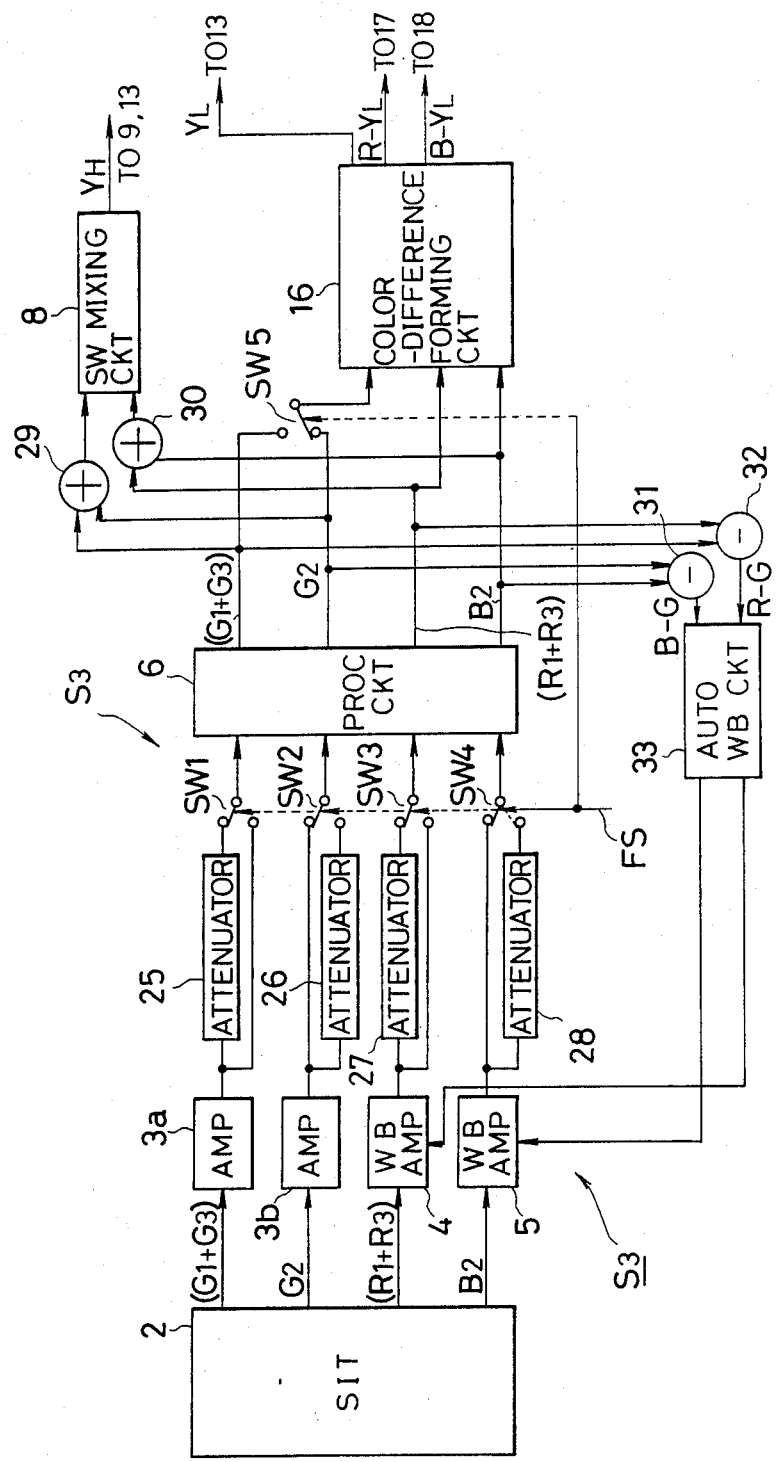
FIG. 8 is a block diagram showing signal processing means of the third embodiment of the invention.

FIGS. 7 and 8 show a third embodiment of the present invention. In contrast with the first and second embodiments wherein two horizontal lines are simultaneously read, in the third embodiment three horizontal lines are simultaneously read as shown in FIG. 7 to further improve the quality of image. In this embodiment, image information readout means may use the same elements as shown in FIG. 2 by changing selection of horizontal lines by means of the vertical switch $2a_2$. For instance, in reading $n_1H$ in the odd field, selection is conducted such that both upper and lower horizontal lines $l_1$ and $l_3$ among three horizontal lines $l_1$, $l_2$ and $l_3$ are added together on the same signal line and the middle horizontal line $l_2$ is read out onto another signal line.

FIG. 8 is a block diagram showing the main part of signal processing means S3 according to the third embodiment of the invention. In this embodiment, four color signals are outputted from SIT2. For instance, in the case of reading $n_1H$, the four color signals include: color signals $G_2$ and $B_2$ (hereinafter called main signal) for middle horizontal line $l_2$; color signals (hereinafter called sub-signal) of G signal $(G_1+G_3)$ and R signal $(R_1+R_3)$ obtained by adding together the color signals of the upper and lower horizontal lines $l_1$ and $l_3$. In this case, the sub-signal obtained through addition has a signal level higher than that of the main signal by 6 dB. Consequently, attenuators 25, 26, 27 and 28 are respectively inserted between a process circuit 6, and amplifiers 3a and 3b and white balance amplifiers 4 and 5 to thereby make the signal levels of R, G and B signals inputted to the process circuit 6 coincide with each other. By doing so, compensation for a false signal can be achieved. This construction is another feature of the present invention. The color signals from the amplifiers 3a and 3b and the white balance amplifiers 4 and 5 are alternately outputted at each field as a main signal and a sub-signal. To this end, the attenuators 25, 26, 27 and 28 are selectively used by switching switches SW1, SW2, SW3 and SW4. This is effective in that the circuit arrangement is made simple. This is also a further feature of the present invention.

Figure 9:
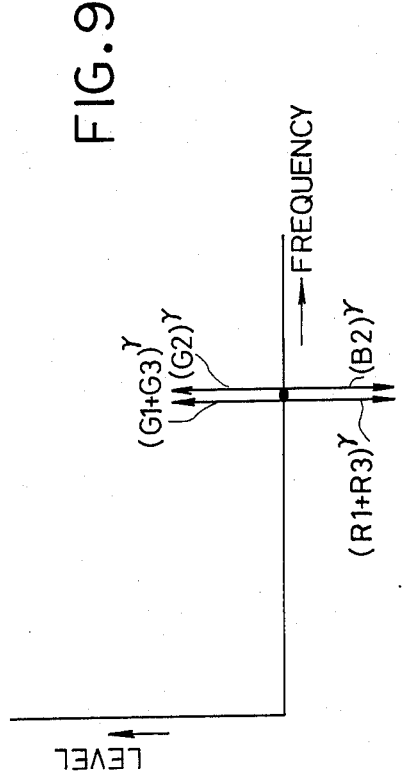
FIG. 9 is a graph showing return distortion in FIG. 8.

These switches SW1, SW2, SW3 and SW4 are switched in response to a field switching signal FS. In case switches SW1 and SW2 are connected to the attenuators 25 and 27 (e.g., for the odd fields), the other switches SW2 and SW4 are directly coupled to the outputs of the amplifier 3b and the white balance amplifier 5. In case switches SW2 and SW4 are connected to the attenuators 26 and 28 (e.g., for the even fields), the other switches SW1 and SW3 are directly coupled to the outputs of the amplifier 3a and the white balance amplifier 4. Consider reading of n H, then color signals $(G_1+G_3)$ and $G_2$ outputted from the process circuit 6 are added together at an adder 29, while color signals $(R_1+R_3)$ and $B_2$ outputted from the process circuit 6 are added together at an adder 30. Thereafter, the color signals outputted from the adders 29 and 30 are switch-mixed at a switch mixing circuit 8. A color-difference forming circuit 16 is inputted with color signals $(R_1+R_3)$ and $B_2$ as well as one (in this case, $G_2$) of the main signals as G signal. This main signal $G_2$ only is inputted through switch SW5 actuated in response to the field switching signal. Thereafter, a low frequency range luminance signal YL is formed at the color-difference forming circuit 16 using these color signals, so that a good vertical resolution can be obtained. A composite luminance signal can be obtained through the similar signal processing to that with FIG. 3, using a high frequency range luminance signal from the switch mixing circuit 8 and the low frequency range luminance signal YL. In this case, since signals of three horizontal lines $l_1$, $l_2$ and $l_3$ are combined, compensation effects of return distortion are further improved as shown in FIG. 9. This is another feature of the present invention. Reference numerals 31 and 32 represent color-difference signal forming circuits, where (R−G) and (B−G) signals can be produced based on color signals of the same horizontal lines. Therefore, the effects of white balance by the next stage automatic white balance circuit 33 are also improved.

Figure 10:
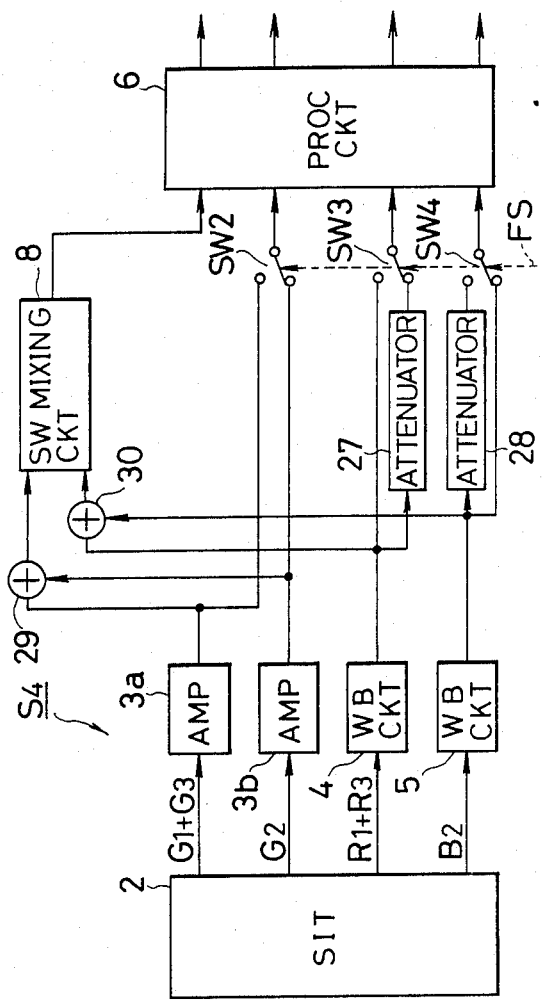
FIG. 10 is a block diagram showing the main part of the signal processing apparatus of a fourth embodiment of the invention.

FIG. 10 is a block diagram showing the main part of signal processing means S4 according to a fourth embodiment of the invention. In this embodiment, the switch mixing as of the third embodiment is performed prior to the signal processing. Similarly to the second embodiment, the requirements of circuit accuracy can be lightened. Reference numerals in FIG. 10 same as those in FIGS. 1 to 9 represent identical elements.

Figures 11, 12:
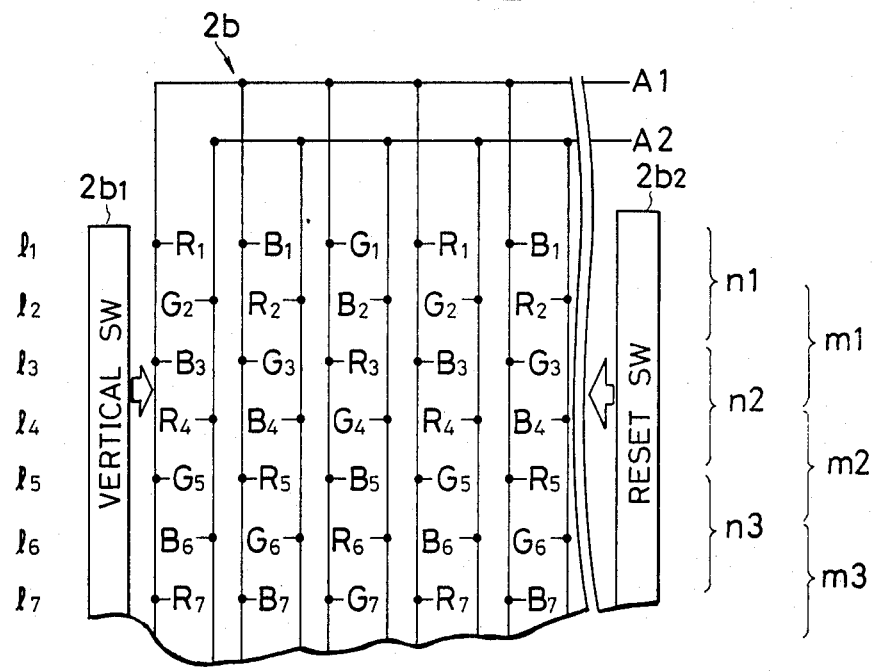
FIG. 11 is an illustrative view showing an example of the arrangement of a color separation filter used with a fifth embodiment of the invention.
FIG. 12 is a schematic view showing signal processing means of the fifth embodiment of the invention.

FIGS. 11 to 14 show a fifth embodiment of the invention. In this embodiment, a color separation filter 1b disposed as shown in FIG. 11 is used for reading three horizontal lines. The arrangement of color transmission filters is made such that any combination of three adjacent filters either in the horizontal or vertical direction may include red, green and blue filters. By using the color separation filter 1b, R, G and B signals are always obtained from the main signals. Therefore, in forming a low frequency range luminance signal from R, G and B signals, vertical correlation is conducted only for a high frequency range luminance signal, thereby eliminating a fear of degrading a vertical resolution. Furthermore, since R, G and B signals are included in every vertical line, it is advantageous in that mere addition process suffices in place of the switch mixing process. This is also a feature of the present invention. Regarding image information readout means 2b, a two line output system may be employed as shown in FIG. 12, thereby enabling one to manufacture the apparatus with ease. In the figure, reference 2b represents a vertical selection switch and reference 2b represents a reset switch.

Figure 13:
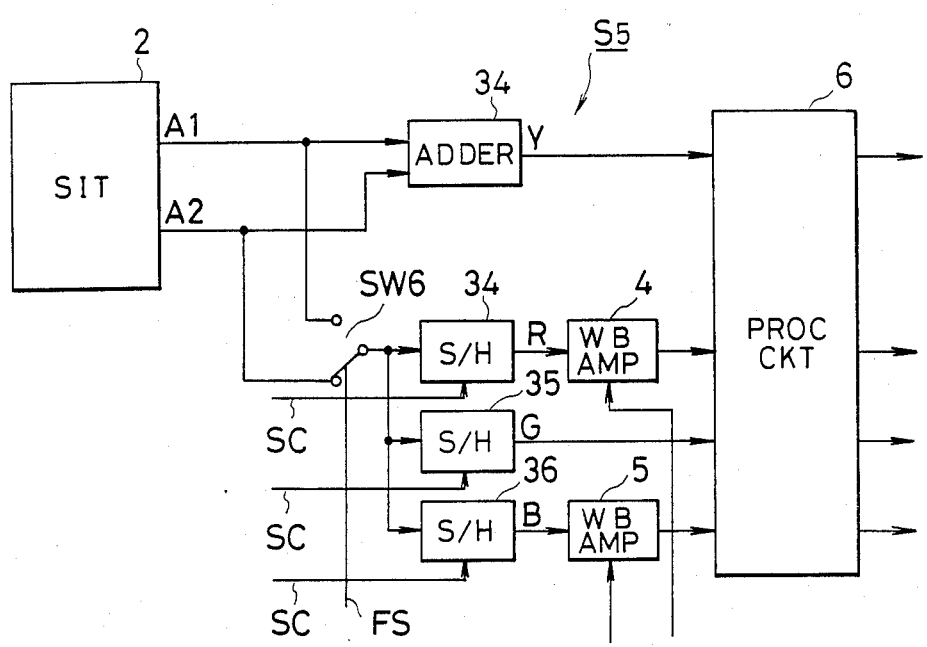
FIG. 13 is a block diagram showing signal processing means of the fifth embodiment of the invention.
Figure 14:
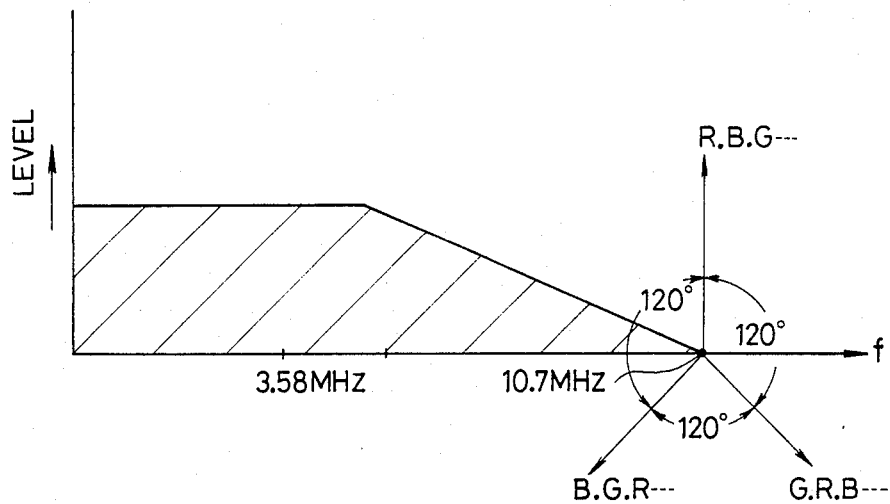
FIG. 14 is a graph showing return distortion in FIG. 13.

FIG. 13 is a block diagram showing signal processing means S5 according to the fifth embodiment of the invention. In the figure, two signal outputs A1 and A2 outputted from SIT2 are added as they are at an adder 34 to produce a luminance signal Y including a high frequency range component. In this case, in an ideal condition sensing an achromatic image, return distortion is not generated up to 10.7 MHz, as shown in FIG. 14. Therefore, the filter characteristics are not severe and its design is easy. Switch SW6 is switched in response to a field switching signal for each one field, thereby ensuring always to deliver a main signal. The color signals delivered via switch SW6 are color-separated into R, G and B signals by sample-and-hold circuits 34, 35 and 36. A process circuit 6 is inputted with G signal, and R and B signals respectively through white balance amplifiers 4 and 5. In this case, sample-and-hold command pulses SC are required to be shifted in their sampling phases by the amount corresponding to two pixels for each 1 H.

What is claimed is:
1. An image sensing apparatus comprising:
   (a) image sensor means wherein a plurality of photoelectric conversion elements are disposed in row and column directions, said photoelectric conversion elements being arranged to convert an optical image into an electrical signal;
   (b) readout means for simultaneously reading the electrical signals, of said plurality of photoelectric conversion elements, corresponding to three rows;
   (c) image signal forming means for forming image signals by using said electrical signals corresponding to three rows, read by said readout means; and
   (d) refreshing means for clearing, after reading the signals corresponding to a three rows read by said readout means, signals corresponding at least to the same number of rows as read.

2. An image sensing apparatus according to claim 1, wherein said readout means simultaneously reads signals corresponding to a plurality of rows in a predetermined time during a first period, and thereafter simultaneous reads signals corresponding to the same number of different rows in said predetermined time during a second period.

3. An image sensing apparatus according to claim 2, wherein said rows to be read during first and second periods are common in part.

4. An image sensing apparatus according to claim 3, wherein said photoelectric conversion element is capable of reading nondestructively.

5. An image sensing apparatus according to claim 1, wherein said image sensor means has a plurality of signal terminals for outputting therethrough signals corresponding to a plurality of rows.

6. An image sensing apparatus according to claim 5, wherein the number of said signal terminals and the number of said plurality of rows in association with which said readout means simultaneously reads are different from each other.

7. A image sensing apparatus according to claim 6, wherein the number of said signal terminals is smaller than the number of said plurality of rows in association with which said readout means simultaneously reads.

8. An image sensing apparatus according to claim 1, further comprising a plurality of color filters for applying different color lights to said plurality of photoelectric conversion elements.

9. An image sensing apparatus according to claim 1, further comprising signal terminals for reading therethrough signals corresponding to said plurality of rows, independently for those photoelectric conversion elements covered with the same color filter.

10. An image sensing apparatus according to claim 8, further comprising high-band luminance signal forming means for forming a high-band luminance signal by mixing the signals corresponding to said plurality of rows.

11. An image sensing apparatus according to claim 8, further comprising low-band luminance signal forming means for forming a low-band luminance signal from the signal corresponding only to a middle row among said plurality of rows.

12. An image sensing apparatus according to claim 8, further comprising addition means for adding together, among the signals corresponding to a plurality of rows simultaneously read by said readout means, signals corresponding to predetermined ones of said photoelectric conversion elements, and wherein said addition means adds together signals of a predetermined plural number of photoelectric conversion elements covered with the same color filter.

13. An image sensing apparatus comprising:
   (a) image sensor means having a plurality of photoelectric conversion elements disposed in row and column directions, said photoelectic conversion elements being arranged to convert an optical image into an electrical signal;
   (b) readout means for simultanously reading the electrical signals, of said plurality of photoelectric conversion elements, corresponding to three rows;

(c) image signal forming means for forming image signals by using said electrical signals corresponding to three rows, read by said readout means; and (d) three types of color fitlers for applying different color lights to said plurality of photoelectric conversion elements, said three types of color filters being disposed in the row and column directions to have repeated combinations of said three types of color filters in both row and column directions.

14. An image sensing apparatus according to claim 13, wherein said three types of color filters include, R, G and B color filters.

15. An image sensing apparatus comprising:
(a) image sensor means having a plurality of photoelectric conversion elements disposed in row and column directions, said photoelectric conversion elements being arranged to convert an optical image into an electrical signal;
(b) readout means for simultaneously reading the electrical signals, of said plurality of photoelectric conversion elements, corresponding to three rows;
(c) image signal forming means for forming image signals by using said electrical signals corresponding to three rows, read by said readout means;
(d) a plurality of signal output terminals for outputting signals corresponding to said three rows from said image sensor means, the number of said signal output terminals being smaller than three; and
(e) addition means for adding together, among the signals corresponding to a plurality of rows simultaneously read by said readout means, signals corresponding to the predetermined photoelectric conversion elements and transferring the added signals to said signal output terminals.

16. An image sensing apparatus according to claim 15, further comprising a plurality of color filters for applying different color lights to said plurality of photoelectric conversion elements.

17. An image sensing apparatus according to claim 16, wherein said addition means adds together signals for a predetermined plural number of photoelectric conversion elements covered with the same color filter.

18. An image sensing apparatus comprising:
(a) image sensor means having a plurality of photoelectric conversion elements disposed in row and column directions, said photoelectric conversion elements being arranged to convert an optical image into an electrical signal;
(b) readout means for simultaneously reading the electrical signals, of said plurality of photoelectric conversion elements, corresponding to a plurality of rows;
(c) high-band luminance signal forming means for forming a high-band luminance signal by mixing signals corresponding to said plurality of rows;
(d) low-band luminance signal forming means for forming a low-band luminance signal from signals corresponding only to one row of said plurality of rows; and
(e) luminance signal addition means for forming a composite luminance signal by adding the high-band luminance signal formed by said high-band luminance signal forming means and a low-band luminance signal formed by said low-band luminance signal forming means.

19. An image sensing apparatus according to claim 18, wherein said high-band luminance signal forming means includes a switch circuit.

20. An image sensing apparatus comprising:
(a) image sensor means having a plurality of photoelectric conversion elements disposed in row and column directions, said photoelectric conversion elements being arranged to convert an optical image into an electrical signal
(b) readout means for simultaneously reading the electrical signals of said plurality of photoelectric conversion elements corresponding to a plurality of rows, a combination of the plurality of rows to be read out being changed field by field in an interlacing manner;
(c) image signal forming means for forming an image by using said electrical signals corresponding to a plurality of rows, read by said readout means; and
(d) refreshing means for clearing, after reading, the signals corresponding to a plurality of rows read by said readout means, said refreshing means refreshing the same combination of rows as the combination of rows to be read out in a next succeeding field.

21. An image sensing apparatus according to claim 20, wherein said readout means simultaneously reads electrical signals corresponding to three rows.

22. An image sensing apparatus according to claim 20, wherein said readout means simultaneously reads signals corresponding to a first set of a predetermined plural number of rows in a predetermined time during a first period, and thereafter simultaneously reads in said predetermined time, during a second period, signals corresponding to a second set of rows, equal in number to said predetermined number but said second set being distinct from said first set.

23. An image sensing apparatus according to claim 22, wherein said rows to be read during said first and second periods are common in part.

24. An image sensing apparatus according to claim 23, wherein said photoelectric conversion elements are capable of being read non-destructively.

25. An image sensing apparatus according to claim 20, wherein said image sensor means has a plurality of signal terminals for outputting therethrough signals corresponding to a plurality of rows.

26. An image sensing apparatus according to claim 25, wherein the number of said signal terminals and the number of said plurality of rows in association with which said readout means simultaneously reads are different from each other.

27. An image sensing apparatus according to claim 26, wherein the number of said signal terminals is smaller than the number of said plurality of rows in association with which said readout means simultaneously reads.

28. An image sensing apparatus according to claim 27, further comprising addition means for adding together, among the signals corresponding to a plurality of rows simultaneously read by said readout means, signals corresponding to predetermined ones of said photoelectric conversion elements.

29. An image sensing apparatus according to claim 20, further comprising a plurality of color filters for applying different color light to said plurality of photoelectric conversion elements.

30. An image sensing apparatus according to claim 20, further comprising signal terminals for reading therethrough signals corresponding to said plurality of rows, independently for those photoelectric conversion elements convered with the same color filter.

31. An image sensing apparatus according to claim 29, further comprising high-band luminance signal forming means for forming a high-band luminance signal by mixing the signals corresponding to said plurality of rows.

32. An image sensing apparatus according to claim 29, further comprising low-band luminance signal forming means for forming a low-band luminance signal from the signal corresponding only to the middle row among said plurality of rows.

33. An image sensing apparatus according to claim 20 wherein the combination of the plurality or rows to be read out and the combination of the plurality or rows to be refreshed are interlaced with each other.

34. An image sensing apparatus comprising:
  (a) image sensor means having a plurality of photoelectric conversion elements disposed in row and column directions, said photoelectric conversion elements being arranged to convert an optical image into an electrical signal;
  (b) readout means for simultaneously reading the electrical signals, of said plurality of photoelectric conversion elements, corresponding to a plurality of rows;
  (c) image signal forming means for forming image signals by using said electrical signals corresponding to a plurality of rows, read by said readout means;
  (d) refreshing means for clearing, after reading of the signals corresponding to a plurality of rows read by said readout means, signals corresponding at least to the same number of rows as are read;
  (e) a plurality of color filters for applying different color light to said plurality of photoelectric conversion elements; and
  (f) low-band luminance signal forming means for forming a low-band luminance signal from the signal corresponding to one row only of said plurality of rows.

35. An image sensing apparatus according to claim 34, wherein said addition means adds together signals of a predetermined plurality number of photoelectric conversion elements covered with the same color filter.

* * * * *

UNITED STATES PATENT AND TRADEMARK OFFICE
CERTIFICATE OF CORRECTION

PATENT NO. : 4,768,085
DATED : August 30, 1988
INVENTOR(S) : SEIJI HASHIMOTO

It is certified that error appears in the above-identified patent and that said Letters Patent is hereby corrected as shown below:

COLUMN 1

Line 22, "alternatively" should read --alternately--.
Line 37, "tively" should read --tely--.

COLUMN 2

Line 11, "image" should read --an image--.
Line 19, "tures" should read --ture--.

COLUMN 3

Line 43, "alternatively" should read --alternately--.
Line 44, "$1_2, 1_4, 1_6$" should read --$1_2, 1_4, 1_6, \ldots$--.
Line 46, "alternatively" should read --alternately--.

COLUMN 5

Line 11, "contour emphasized" should read --contour-emphasized--.
Line 17, "subtractor 13" should read --subtracter 13--.

COLUMN 6

Line 36, "SW2" should read --SW3--.

COLUMN 7

Line 33, "reference 2b" should read --reference 2b1--.
Line 34, "reference 2b" should read --reference 2b1--.

UNITED STATES PATENT AND TRADEMARK OFFICE
CERTIFICATE OF CORRECTION

PATENT NO. : 4,768,085
DATED : August 30, 1988
INVENTOR(S) : SEIJI HASHIMOTO

It is certified that error appears in the above-identified patent and that said Letters Patent is hereby corrected as shown below:

COLUMN 8

Line 2, "a" should be deleted.
Line 9, "neous" should read --neously--.
Line 27, "A" should read --An--.
Line 63, "photoelectic" should read --photoelectric--.
Line 66, "simultanously" should read --simultaneously--.

COLUMN 9

Line 4, "fitlers" should read --filters--.
Line 11, "include," should read --include--.

COLUMN 10

Line 6, "signal" should read --signal;--.
Line 68, "convered" should read --covered--.

COLUMN 11

Line 11, "claim 20" should read --claim 20,--.
Line 12, "or" should read --of--.
Line 13, "or" should read --of--.

UNITED STATES PATENT AND TRADEMARK OFFICE
CERTIFICATE OF CORRECTION

PATENT NO. : 4,768,085
DATED : August 30, 1988
INVENTOR(S) : SEIJI HASHIMOTO

It is certified that error appears in the above-identified patent and that said Letters Patent is hereby corrected as shown below:

COLUMN 12

Line 19, "wherein said addition means" should read --further comprising addition means which--.
Line 20, "plurality" should read --plural--.

Signed and Sealed this

Twenty-eighth Day of March, 1989

*Attest:*

DONALD J. QUIGG

*Attesting Officer*   *Commissioner of Patents and Trademarks*